(12) United States Patent
Unger

(10) Patent No.: US 6,788,225 B2
(45) Date of Patent: Sep. 7, 2004

(54) SYSTEM AND METHOD FOR INTRAFRAME TIMING IN MULTIPLEXED CHANNEL

(75) Inventor: Robert Allan Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 10/374,397

(22) Filed: Feb. 26, 2003

(65) Prior Publication Data

US 2004/0120358 A1 Jun. 24, 2004

Related U.S. Application Data

(60) Provisional application No. 60/435,181, filed on Dec. 19, 2002.

(51) Int. Cl.[7] ................................................. H03M 7/00
(52) U.S. Cl. ........................................ 341/50; 348/384
(58) Field of Search .............................. 341/50, 51, 67; 375/240.1, 240; 348/384, 403, 390, 410, 400, 401, 409, 240; 370/207

(56) References Cited

U.S. PATENT DOCUMENTS

| | | | | |
|---|---|---|---|---|
| 5,442,626 A | * | 8/1995 | Wei ............................. | 370/207 |
| 5,748,240 A | * | 5/1998 | Carr et al. ............. | 375/240.01 |
| 6,031,574 A | * | 2/2000 | Muller .................. | 375/240.12 |
| 6,249,324 B1 | * | 6/2001 | Sato et al. ................... | 348/705 |

* cited by examiner

*Primary Examiner*—Brian Young
*Assistant Examiner*—Joseph Lauture
(74) *Attorney, Agent, or Firm*—John L. Rogitz

(57) ABSTRACT

To reduce peak bandwidth requirements for a channel carrying several multiplexed MPEG-type programs, the generation of large intraframes is coordinated among the programs to avoid two program encoders simultaneously encoding an intraframe.

19 Claims, 1 Drawing Sheet

SYSTEM AND METHOD FOR INTRAFRAME TIMING IN MULTIPLEXED CHANNEL

RELATED APPLICATIONS

This application claims priority from U.S. provisional patent application serial No. 60/435,181, filed Dec. 19, 2002.

I. FIELD OF THE INVENTION

The present invention relates generally to computer-based communication systems.

II. BACKGROUND OF THE INVENTION

Multimedia data such as video and music can be transmitted by multiplexing several programs together on a single channel, as is done in, e.g., broadcast digital multimedia using MPEG standards.

Specifically, multimedia can be formatted in accordance with Moving Pictures Expert Group (MPEG) standards such as MPEG-1, MPEG-2 (also referred to as DVD format), and MPEG-4. Essentially, for individual vidio frames these multimedia standards use Joint Photographic Experts Group (JPEG) compression. In JPEG, the image of a single frame is divided into small blocks of pixels that are processed by a discrete cosine transform (DCT) function to transform the spatial intensity values represented by the pixels to spatial frequency values, roughly arranged, in a block, from lowest frequency to highest. Then, the DCT values are quantized, i.e., the information is reduced by grouping it into chunks by, e.g., dividing every value by 10 and rounding off to the nearest integer. Since the DCT function includes a progressive weighting that puts bigger numbers near the top left corner of a block and smaller numbers near the lower right corner, a special zigzag ordering of values can be applied that facilitates further compression by run-length coding (essentially, storing a count of the number of, e.g., zero values that appear consecutively, instead of storing all the zero values). If desired, the resulting numbers may be used to look up symbols from a table developed using Huffman coding to create shorter symbols for the most common numbers, an operation commonly referred to as "variable length coding". In any case, a JPEG-encoded stream represents horizontal lines of a picture, in much the same way as the underlying pixel data is arranged in a matrix of horizontal rows.

It will be appreciated that JPEG compression results in lost information. However, owing to the phenomenon of human perception and the way that the above process works, JPEG compression can reduce data representing a picture to about one-fifth of its original size with virtually no discernable visual difference and to one-tenth of its original size with only slight visual degradation.

Motion pictures add a temporal dimension to the spatial dimension of single pictures. Typical motion pictures have around twenty four frames, i.e., twenty four still pictures, per second of viewing time. MPEG is essentially a compression technique that uses motion estimation to further compress a video stream.

MPEG encoding breaks each picture into blocks called "macroblocks", and then searches neighboring pictures for similar blocks. If a match is found, instead of storing the entire block, the system stores a much smaller vector that describes the movement (or not) of the block between pictures. In this way, efficient compression is achieved.

MPEG compresses each frame of video in one of three ways. The first way is to generate a self-contained entity referred to as an "intraframe" (also referred to as a "reference frame" and an "information frame"), in which the entire frame is composed of compressed, quantized DCT values. This type of frame is required periodically and at a scene change. Most frames, however, (typically 15 out of 16) are compressed by encoding only differences between the image in the frame and the nearest intraframe, resulting in frame representations that use much less data than is required for an intraframe. In MPEG parlance these frames are called "predicted" frames and "bidirectional" frames, herein collectively referred to as "interframes".

Predicted frames are those frames that contain motion vector references to the preceding intraframe or to a preceding predicted frame, in accordance with the discussion above. If a block has changed slightly in intensity or color, then the difference between the two frames is also encoded in a predicted frame. Moreover, if something entirely new appears that does not match any previous blocks, then a new block can be stored in the predicted frame in the same way as in an intraframe.

In contrast, a bidirectional frame is used as follows. The MPEG system searches forward and backward through the video stream to match blocks. Bidirectional frames are used to record when something new appears, so that it can be matched to a block in the next full intraframe or predictive frame, with predictive frames being able to refer to both preceding and subsequent bidirectional frames. Experience has shown that two bidirectional frames between each intraframe or predictive frame works well, so that a typical group of frames associated with a single intraframe might be: the full intraframe, followed by a predictive frame, followed by two bidirectional frames, another predictive frame, two more bidirectional frames, a predictive frame, two more bidirectional frames, a predictive frame, and finally two more bidirectional frames, at which point a new full intraframe might be placed in the stream to refresh the stream.

The present invention, in contemplating the above principles, recognizes that several programs might be conveyed in a single channel of finite bandwidth using principles of multiplexing, and that it might happen that a large intraframe of one program might temporally coincide with those of one or more other programs, consuming a large amount of bandwidth for that instant.

SUMMARY OF THE INVENTION

A communication system includes plural encoders, with each encoding a respective program to generate intraframes and interframes. A processor coordinates at least two of the encoders such that the simultaneous encoding of intraframes by the encoders is avoided for at least a portion of a program.

In a preferred embodiment, the processor causes periodic generation of intraframes to rotate from encoder to encoder. A virtual token can be used for this purpose. The token can be passed from encoder to encoder, with possession of the token being a prerequisite to encode an intraframe. An encoder then relinquishes the token to another encoder upon completion of intraframe encoding. The programs may be multiplexed on a single channel and may be compressed using MPEG principles.

In another aspect, a method for managing bandwidth demand in a channel carrying at least two programs includes reducing the likelihood that intraframes for a threshold number of programs coincidentally will be generated simultaneously with each other.

In still another aspect, a system includes generating means for generating at least two video streams characterized by intraframes and interframes, and multiplexing means for causing a single channel to convey at least two video streams simultaneously. Coordinating means substantially prevent the simultaneous generation of more than a threshold number of intraframes.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
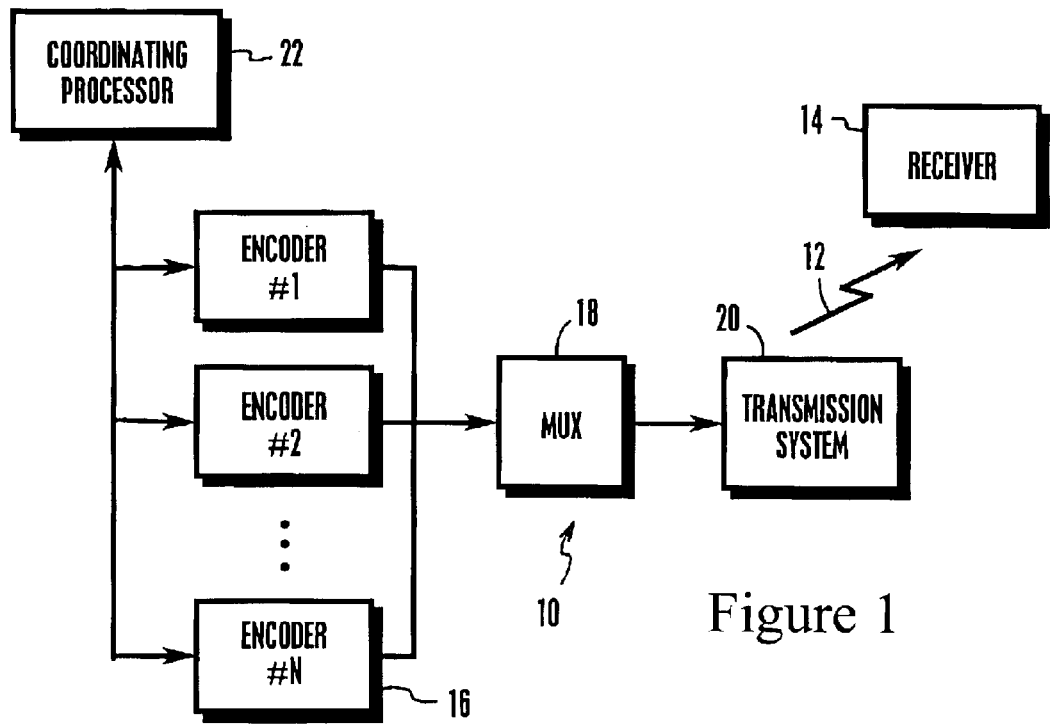
FIG. 1 is a block diagram of the present system.

Referring initially to FIG. 1, a system is shown, generally designated 10, that broadcasts, using a preferably unidirectional channel 12, multimedia content in the form of multimedia streams to receivers 14 (only a single receiver 14 shown for clarity). The multimedia streams, which can establish respective programs, can be from respective encoders 16 (labelled encoders 1,2, . . . ,N in FIG. 1), and the programs are multiplexed together into a single channel by a multiplexer 18 for transmission by a transmission system 20. A coordinating processor 22 may be provided to execute the logic disclosed below, it being understood that the functions of the coordinating processor 22 can alternatively be undertaken by one or more processors associated with the encoders 16

In any case, the encoders 16 encode their respective programs or streams into intraframes and interframes in accordance with MPEG principles set forth above. The preferred non-limiting intraframes may be substantially composed of symbols representing encoded quantized DCT values that in turn represent pixels of a video frame. The programs also include smaller interframes, including predicted frames and bidirectional frames as set forth above.

The coordinating processor 22 coordinates at least two of the encoders 16 (and preferably all of the encoders 16) such that the simultaneous encoding of intraframes is avoided. The preferred coordinating processor 22 does this by causing periodic generation of intraframes to rotate from encoder to encoder. In a non-limiting embodiment, a virtual token is passed from encoder to encoder, with possession of the token being a prerequisite to encode an intraframe and with an encoder relinquishing the token to another encoder upon completion of intraframe encoding.

Figure 2:
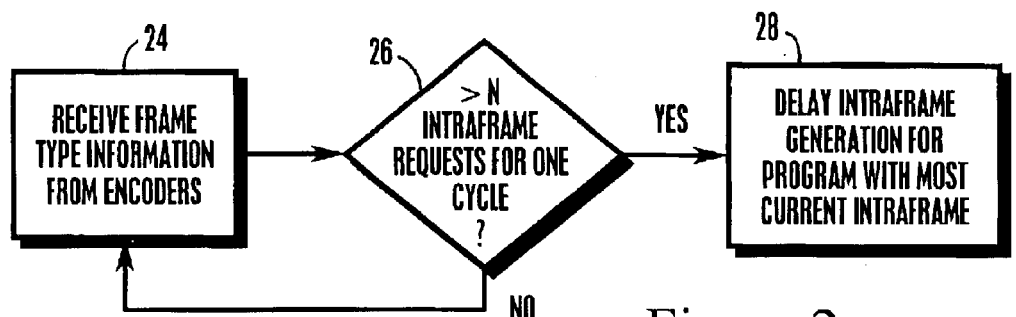
FIG. 2 is a first logic flow chart.
Figure 3:
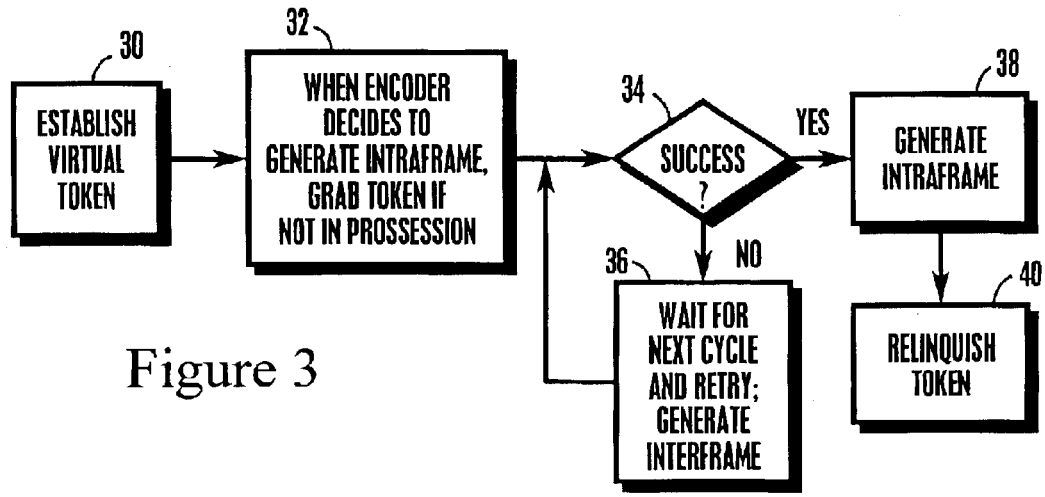
FIG. 3 is a second logic flow chart

FIGS. 2 and 3 show the operation of the logic with more specificity, either as alternatives to each other or as more general and more specific implementations, respectively. Commencing at block 24 in FIG. 2, information regarding the types of frames sought to be generated in an upcoming frame cycle is examined to determine, at decision diamond 26, whether more than a threshold number of intraframes for that cycle are to be generated in aggregate by the encoders 16. In one non-limiting example, the threshold number is one, i.e., it is desired that no more than one encoder will generate an intraframe for any single cycle. For larger bandwidth systems, the threshold number might be higher.

In the event that the threshold number is exceeded, the logic moves to block 28 to command, of one or more of the encoders seeking to generate an intraframe in the cycle under test, a delay in intraframe generation for at least one cycle. For example, if two encoders indicate intraframe generation in a single cycle and the threshold number of intraframes per cycle among the encoders 16 in aggregate is one, the encoder that most recently generated an intraframe might be commanded to wait a cycle to generate another intraframe. Or, as between one encoder seeking to generate a periodic refresh intraframe and another encoder seeking to generate an intraframe owing to a scene change, the encoder seeking to generate a periodic refresh intraframe might be commanded to wait a cycle. In any case, periodic intraframe generation rotates from encoder to encoder.

FIG. 3 shows that tokens can be used to implement the above principles without frame type information being explicitly passed to the coordinating processor 22 and without explicit encoding commands being passed to the encoders 16. Commencing at block 30, a virtual token is established. Moving to block 32, a DO loop is entered when an encoder decides to generate an intraframe. The encoder obtains the token for the cycle in which an intraframe is sought to be generated, if the encoder has not already come into possession of the token as it was relinquished by another encoder. Moving to decision diamond 34, the encoder determines whether it was successful in obtaining the token. If not, the encoder can generate an intraframe and wait for the next cycle at block 36 to try again. On the other hand, if the encoder has the token it generates the intraframe at block 38 for the particular cycle sought, and then at block 40 the encoder relinquishes the token to, e.g., the encoder that has not generated an intraframe for the longest period, or, e.g., to an encoder requiring a token for a scene change.

While the particular SYSTEM AND METHOD FOR INTRAFRAME TIMING IN MLULTIPLEXED CHANNEL as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and arc intended to be encompassed by the present claims. Moreover, it is not necessary for a device or method to address each and every problem sought to be solved by the present invention, for it to be encompassed by the present claims. Furthermore, no element, component, or method step in the present disclosure is intended to the public regardless of whether the element, component, or method step is explicitly recited in the claims, No claim element herein is to be construed under the provisions of 35 U.S.C. §112, sixth paragraph, unless the element is expressly recited using the phrase "means for" or, in the case of a method claim, the element is recited as a "step" instead "act".

What is claimed is:

1. A communication system, comprising:

plural encoders, each encoding a respective program to generate at least intraframes and interframes; and at least one processor having logic to coordinate at least two encoders of the plural encoders such that the simultaneous encoding of intraframes by at least two encoders is avoided for at least one portion of at least one program.

2. The system of claim 1, wherein the processor causes periodic generation of intraframes to rotate from encoder to encoder.

3. The system of claim 1, wherein the processor causes a virtual token to be passed from encoder to encoder, possession of the token being a prerequisite to encode an intraframe.

4. The system of claim 3, wherein an encoder relinquishes the token to another encoder upon completion of intraframe encoding.

5. The system of claim 1, wherein the programs are multiplexed on a single channel.

6. The system of claim 1, wherein the programs are compressed using MPEG principles.

7. A method for managing bandwidth demand in at least one channel carrying at least two programs, comprising:

reducing the likelihood that intraframes for at least a threshold number of programs coincidentally will be generated simultaneously with each other by a least two encoders each of which can generate intraframes.

8. The method of claim 7, wherein the reducing act is undertaken by preventing at least two intraframes associated with respective program from being generated simultaneously with each other.

9. The method of claim 7, further comprising multiplexing the programs in the channel.

10. The method of claim 9, further comprising broadcasting the programs.

11. The method of claim 7, wherein the act of reducing includes coordinating at least two encoders associated with at least two programs.

12. The nethod of claim 11, comprising causing periodic generation of intraframes to rotate from encoder to encoder.

13. The method of claim 11, comprising causing a virtual token to be passed from encoder to encoder, possession of the token being a prerequisite to encode an intraframe.

14. The method of claim 13, wherein an encoder relinquishes the token to another encoder upon completion of intraframe encoding.

15. A system, comprising:

generating means for generating at least two video streams characterized by intraframes and interframes;

multiplexing means for causing a single channel to convey at least two video streams simultaneously; and coordinating means for substantially preventing the simultaneous generation of more than a threshold number of intraframes, wherein periodic generation of intraframes is caused to rotate from one encoder to another encoder in the generating means.

16. The system of claim 15, wherein the threshold number is one.

17. The system of claim 15, wherein the coordinating means includes at least one processor.

18. The system of claim 15, wherein the generating means include at least two encoders generating respective vidio streams.

19. The system of claim 18, wherein a virtual token is passed from encoder to encoder, possesion of the being a prerequisite to encode an intraframe.

* * * * *